(12) United States Patent
Wambach et al.

(10) Patent No.: US 8,318,121 B2
(45) Date of Patent: Nov. 27, 2012

(54) DEVICE AND METHOD FOR THE PROCESSING OF NON-FERROUS METALS

(75) Inventors: Karsten Wambach, Oberschöna (DE); Claudia Knopf, Freiberg (DE); Ingo Röver, Freiberg (DE)

(73) Assignee: Sunicon AG, Freiberg/Sachsen (DE)

( * ) Notice: Subject to any disclaimer, the term of this patent is extended or adjusted under 35 U.S.C. 154(b) by 411 days.

(21) Appl. No.: 12/516,840

(22) PCT Filed: Oct. 13, 2007

(86) PCT No.: PCT/EP2007/008906
§ 371 (c)(1),
(2), (4) Date: May 29, 2009

(87) PCT Pub. No.: WO2008/064738
PCT Pub. Date: Jun. 5, 2008

(65) Prior Publication Data
US 2010/0040526 A1    Feb. 18, 2010

(30) Foreign Application Priority Data

Nov. 30, 2006  (DE) .......................... 10 2006 056 482

(51) Int. Cl.
*C01B 33/037* (2006.01)
*C22B 9/04* (2006.01)
*C22B 9/02* (2006.01)

(52) U.S. Cl. .............. 423/348; 75/405; 75/406; 75/407; 75/585; 423/349; 423/350

(58) Field of Classification Search .......... 423/348–350; 75/585, 405–407
See application file for complete search history.

(56) References Cited

U.S. PATENT DOCUMENTS

| | | | |
|---|---|---|---|
| 3,008,887 A | 11/1961 | Herglotz | |
| 3,442,622 A | 5/1969 | Monnier et al. | |
| 4,097,584 A | 6/1978 | Reuschel et al. | |
| 4,242,175 A | 12/1980 | Zumbrunnen | |
| 4,837,376 A * | 6/1989 | Schwirtlich et al. | 423/348 |
| 4,900,532 A | 2/1990 | Kurz et al. | |
| 6,036,932 A * | 3/2000 | Hongu et al. | 423/348 |
| 6,607,578 B2 * | 8/2003 | Otaki et al. | 75/414 |

FOREIGN PATENT DOCUMENTS

| | | |
|---|---|---|
| DE | 26 23 413 | 12/1977 |
| DE | 35 04 723 A1 | 8/1986 |
| DE | 37 27 646 A1 | 3/1989 |
| DE | 41 28 325 A1 | 3/1993 |
| DE | 4128325 A1 * | 3/1993 |
| EP | 0 530 567 | 3/1993 |
| JP | 2001/294949 A | 10/2001 |

OTHER PUBLICATIONS

B.R. Bathey and M.C. Cretella, "Review Solar-grade Silicon," Journal of Materials Science 17 (1982), pp. 3077-3096.*

* cited by examiner

*Primary Examiner* — Stanley Silverman
*Assistant Examiner* — Diana J Liao
(74) *Attorney, Agent, or Firm* — McGlew and Tuttle, P.C.

(57) ABSTRACT

In a device and a method for the processing of non-ferrous metals for simple and economic reduction of the concentration of impurity elements and/or impurity compounds contained in the non-ferrous metal, it is provided to gas the non-ferrous metal in a processing column with at least one gas at a low pressure, causing the impurity elements and/or impurity compounds to evaporate.

1 Claim, 4 Drawing Sheets

DEVICE AND METHOD FOR THE PROCESSING OF NON-FERROUS METALS

CROSS REFERENCE TO RELATED APPLICATIONS

This application is a United States National Phase application of International Application PCT/EP 2007/008 906 and claims the benefit of priority under 35 U.S.C. §119 of German Patent Application DE 10 2006 056 482.0 filed Nov. 30, 2006, the entire contents of which are incorporated herein by reference.

FIELD OF THE INVENTION

The invention relates to a device and a method for the processing of non-ferrous metals, in particular of silicon.

BACKGROUND OF THE INVENTION

The silicon required for the production of solar cells must have a high level of purity. Due to the strong global increase in demand for high-purity silicon, the solar industry increasingly uses processed secondary silicon or metallurgical silicon and purified metallurgical silicon for the production of solar cells. Secondary silica are by-products of the semiconductor industry whose levels of purity are no longer sufficient for the semiconductor industry but meet the requirements for the production of solar cells after a corresponding treatment. The secondary silicon is in particular a silicon which contains high concentrations of doping elements such as boron, gallium, phosphorous, arsenic or antimony. The concentration of these doping elements needs to be reduced in the processing of the silicon.

Various prior-art methods are known for processing silicon containing doping elements, for instance slag extraction, crystallization of the silicon melt and low-pressure evaporation. The drawback of the mentioned methods is that several processing steps are necessary in order to achieve the desired purity of the silicon, thus resulting in correspondingly long processing times. Moreover, the mentioned methods produce large amounts of spontaneously igniting or toxic by-products which are difficult and expensive to dispose of. Finally, there are considerable losses of silicon.

A continuous method of producing purified silicon is disclosed in EP 0 530 567 A1 where the silicon to be purified is treated with reactive gases or reactive gas mixtures. Reducing the concentration of boron in the silicon to be purified is performed by means of the reactive gas hydrogen or by means of a reactive gas mixture which is composed of hydrogen and water vapor. The drawbacks of this method are that only the concentration of boron can be reduced to a sufficient degree, and that there are considerable losses of silicon as well.

SUMMARY OF THE INVENTION

It is the object of the invention to provide a device and a method for the processing of non-ferrous metals, in particular of silicon, which ensure a simple, universally applicable and economic processing for the production of solar cells.

This object is achieved by a device for the processing of non-ferrous metals, in particular of silicon, the device comprising at least one melting device for melting a non-ferrous metal contaminated with at least one impurity element and/or at least one impurity compound, at least one processing reactor for processing the molten non-ferrous metal, the processing reactor comprising at least one reactor container at least one processing column arranged inside the reactor container and at least one heating device arranged outside the reactor container for heating the at least one processing column, at least one low-pressure generation device for generating a low pressure inside the at least one reactor container, at least one gas supply device for gassing the at least one molten non-ferrous metal, which has been supplied to the at least one processing column, with at least one gas, and at least one filtering device which is arranged above the processing reactor in a direction opposite to the direction of flow for the recovery of evaporated non-ferrous metal. Furthermore, this object is achieved by a method for the processing of non-ferrous metals, in particular of silicon, the method comprising the steps of providing at least one processing reactor which comprises at least one reactor container, at least one processing column arranged inside the reactor container and at least one heating device arranged outside the reactor container, melting a non-ferrous metal, which is contaminated with at least one impurity element and/or at least one impurity compound, by means of at least one melting device, supplying the molten non-ferrous metal to the at least one processing column, heating the at least one processing column to a reaction temperature by means of the at least one heating device, generating a low pressure in the reactor container by means of at least one low-pressure generation device, gassing the molten non-ferrous metal, which has been supplied to the at least one processing column, with at least one gas by means of a gas supply device, evaporating at least one impurity element and/or at least one impurity compound from the non-ferrous metal, which is surrounded and/or passed through by the at least one gas, at low pressure, recovering non-ferrous metal, which has evaporated during the evaporation, by means of at least one filtering device, and discharging the processed non-ferrous metal from the processing reactor. The gist of the invention is that a non-ferrous metal, which is contaminated with at least one impurity element and/or an impurity compound, is melted and supplied to at least one processing reactor where the molten non-ferrous metal is gassed at a low pressure by means of a gas supply device, causing the at least one impurity element and/or the at least one impurity compound to evaporate at an appropriate reaction temperature in the reactor container. The at least one impurity compound may either be present in the contaminated non-ferrous metal already or may develop during the gassing of the molten non-ferrous metal. A continuous processing of the non-ferrous metal is possible by providing at least one processing column and by gassing the molten non-ferrous metal at a low pressure with at least one gas; in this process, the weight concentration of the at least one impurity element and/or the at least one impurity compound can be reduced to less than $1 \cdot 10^{-7}$ g per each gram of the non-ferrous metal (=0.1 ppmg) in a single passage through the at least one processing column. The inventive method is therefore a continuous method. Gassing the molten non-ferrous metal with at least one gas not only has the effect of a continuous mixing of the melt but also results in a controlled passage of the melt through the processing column whilst facilitating the reduction of the at least one impurity element and/or the at least one impurity compound contained in the non-ferrous metal; last but not least, the free evaporation of unwanted by-products is minimized. The method and the device allow the contaminated non-ferrous metal to be processed continuously, with the concentration of various impurity elements and/or impurity compounds being reducible to an extremely variable extent depending on the pressure and on the reaction temperature as well as on the supplied gas.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
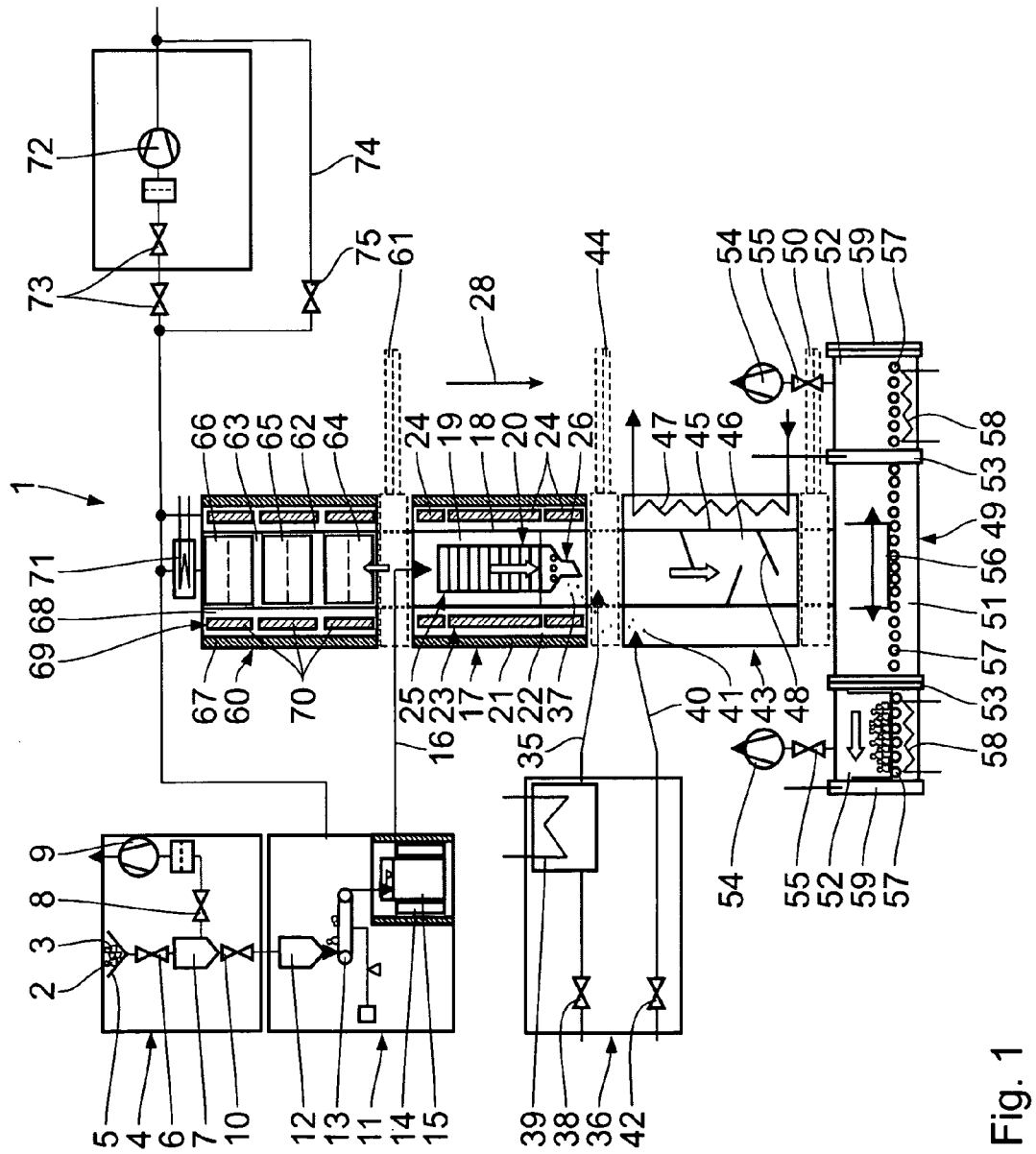
FIG. 1 shows the basic principle of a device for the processing of non-ferrous metals according to a first embodiment.
Figure 2:
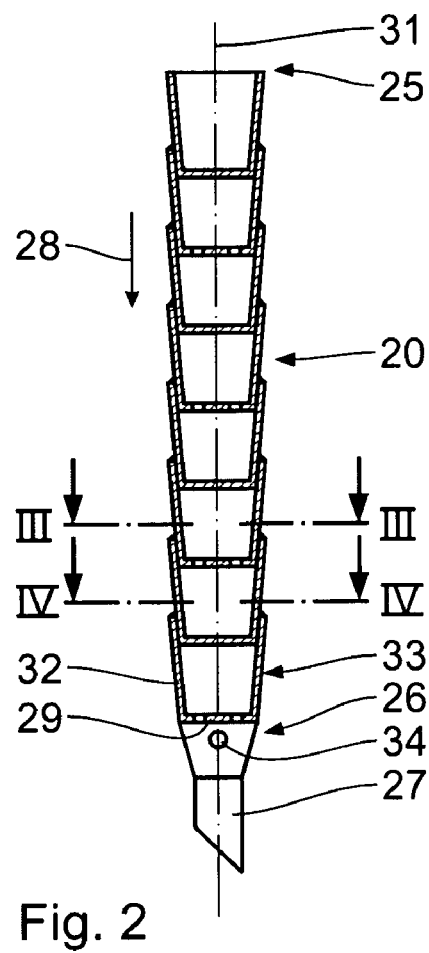
FIG. 2 is a section through a processing column of the device in FIG. 1.
Figure 3:
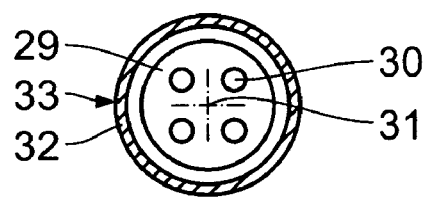
FIG. 3 is a section through the processing column in FIG. 2 along line III-III.
Figure 4:
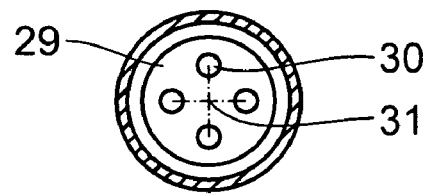
FIG. 4 is a section through the processing column in FIG. 2 along line IV-IV.

The following is a description of a first embodiment of the invention with reference to FIGS. 1 to 4. A processing device 1 for the processing of silicon as an example of a non-ferrous metal 3 contaminated with at least one impurity element and/or at least one impurity compound 2 comprises a feed device 4 for feeding the contaminated silicon 3. The feed device 4 comprises a feed hopper 5 which is connected to a refill container 7 via a first feed valve 6. The refill container 7 is connected to a first low-pressure generation device 9 for evacuation via a second feed valve 8. The refill container 7 is further connected to a downstream melting device 11 via a third feed valve 10.

The melting device 11 comprises a metering container 12 for receiving the silicon 3 contaminated with the at least one impurity element 2, a metering element in the form of a belt weigher 13 arranged downstream of the metering container 12, and a melting container 15 arranged downstream thereof which is heatable by means of a first heating device 14 for melting the solid silicon 3. In addition or as an alternative to the metering element arranged upstream of the melting container 15, the melting container 15 may comprise a metering element designed as a needle valve, for example.

The melting container 15 is connected to a processing reactor 17 via a connection line 16. The processing reactor 17 comprises a tube-shaped reactor container 18 of a silicon-resistant material such as graphite, silicon carbide, quartz or silicon nitride. The reactor container 18 encloses an interior 19 of the reactor inside which is arranged a processing column 20. The reactor container 18 is surrounded by a reactor jacket 21, with a reactor jacket space 22 being formed between the reactor jacket 21 and the reactor container 18. In the reactor jacket space 22, a second heating device 23 is arranged outside the reactor container 18 for electrically heating the processing column 20. The second heating device 23 comprises several heating elements 24 which are arranged one above the other.

The processing column 20 comprises a column head 25 and a column foot 26 with a drip nose 27. The drip nose 27 may be swingably mounted for inducing vibrations. The connection line 16 opens into the processing reactor 17 above the column head 25. Between the column head 25 and the column foot 26, at least one, advantageously at least three, in particular at least five, and in particular at least ten separation trays 29 are arranged one above the other when seen in a direction of flow 28. The processing column 20 according to FIGS. 1 to 4 is a high-temperature resistant perforated-tray column. The separation trays 29 may alternatively also be designed differently, for instance as bubble trays. The separation trays 29 are circular and comprise four separation tray holes 30 arranged in the shape of a square, wherein separation trays 29, which are arranged in succession in the direction of flow 28, are rotated through 45° about a central longitudinal axis 31 of the processing column 20. A different number and arrangement of the separation tray holes 30 is conceivable as well. In order to form a separation container 33, the separation trays 29 are in each case connected to a tubular separation container rim 32 expanding in a direction opposite to the direction of flow 28, with the separation containers 33 being frictionally or positively arranged one inside the other such as to form the processing column 20. A pressure compensation between the separation containers 33 and the drip nose 27 is provided for by means of a pressure compensation hole 34 disposed in the drip nose 27. In addition to that, a mass spectrometer may be arranged at the column foot 26 for analyzing the purified silicon.

The processing column 20 may generally consist of a single separation container 33 as well.

Instead of a processing column 20 designed as a perforated-tray column, there may alternatively be provided several dishes comprising in each case one separation tray 29 which are arranged one above the other and are connected via overflows.

A first gas supply line 35 of a gas supply device 36 opens into the interior 19 of the reactor container 18 below the column foot 26 when seen in the direction of flow 28. By means of the gas supply device 36, a process gas 37 is introducible into the interior 19 of the reactor via a first gas supply valve 38 and a gas preheating device 39. The process gas 37 may also be a gas mixture. The gas supply device 36 further comprises a second gas supply line 40 which opens into the reactor jacket space 22 below the column foot 26 when seen in the direction of flow 28. By means of the gas supply device 36, a flushing gas 41 is introducible into the reactor jacket space 22 via a second gas supply valve 42. The flushing gas 41 may be a gas mixture as well. The connection between the first gas supply line 35 and the reactor container 18 is such that the process gas 37 flows through the processing column 20 in the interior 19 of the reactor container 18 in the direction opposite to the direction of flow 28 of the silicon 3.

A cooling device 43 for cooling and solidifying the liquid and purified silicon 3 is arranged downstream of the processing reactor 17 when seen in the direction of flow 28. A first shut-off valve 44 is arranged between the processing reactor 17 and the cooling device 43 for separating the latter from the former. The cooling device 43 comprises a cooling container 45 which is designed as a downcomer enclosing a cooling chamber 46. The cooling container 45 is cooled by means of a cooling system, for instance a water cooling system 47, which is provided outside the cooling container 45. In the cooling chamber 46, baffle plates 48 extend from the cooling container 45, the baffle plates 48 being inclined in the direction of flow 28. As an alternative to the granulation of the purified silicon 3, the purified silicon 3 may also be subjected to a controlled solidification, film casting or continuous casting process by means of the cooling device 43.

Downstream of the cooling device 43, a discharge device 49 is arranged in the direction of flow 28 which is separable from the cooling device 43 by means of a second shut-off valve 50. The discharge device 49 comprises a main chamber 51 arranged centrally relative to the cooling device, and two side chambers 52 arranged on both sides of the main chamber 51, with the side chambers 52 being connectable to the main chamber 51 by means of in each case one first gate device 53. A second low-pressure generation device 54 is allocated to each of the side chambers 52 for evacuation thereof, allowing the side chambers 52 to be evacuated independently from one another via side chamber valves 55. Below the cooling container 45 inside the main chamber 51, a collection container 56 is displaceably arranged on rolls 57. In the side chambers 52, rolls 57 are arranged as well which are in line with the rolls 57 in the main chamber. For cooling the collection container 56, cooling elements 48 are provided which are arranged below the rolls 57 in the side chambers 52. On the side of the side chambers 52 remote from the first gate devices 53 is in each case arranged a second gate device 59 for discharging the collection container 56 from the side chambers 52.

In the direction opposite to the direction of flow 28, a filtering device 60 is arranged above the processing reactor 17, the filtering device 60 being separable from the processing reactor 17 by means of a third shut-off valve 61. The filtering device 60 comprises a filter container 62 which encloses a filter chamber 63. In the filter chamber 63, a first filter element 64, a second filter element 65 and a third filter element 66 are arranged one above the other in the direction of flow 28. The filtering device 60 further comprises a filter jacket 67 which defines a filter jacket space 68 together with the filter container 62. In the filter jacket space 68 is arranged a third heating device 69 with separate heating elements 70 for the filter elements 64, 65, 66.

Downstream of the filtering device 60, a condenser 71 is arranged in the direction opposite to the direction of flow 28. A third low-pressure generation device 72 is provided for generating a low pressure in the melting device 11, the processing reactor 17, the cooling device 43, the main chamber 51 of the discharge device 49, the filtering device 60 and the condenser 71, the third low-pressure generation device 72 being arranged downstream of the condenser in the direction opposite to the direction of flow 28. Between the condenser 71 and the third low-pressure generation device 72, two low-pressure valves 73 are arranged in succession. A by-pass line 74 with a by-pass valve 75 is arranged parallel to the low-pressure valves and the third low-pressure generation device 72.

The following is a description of the functioning of the processing device 1. The processing device is operated continuously. The silicon 3, which is contaminated with at least one impurity element and/or at least one impurity compound 2 is filled into the feed hopper 5 of the feed device 4. The solid silicon 3 is supplied in the form of solid pieces of silicon having a diameter of preferably 0.05 to 100 mm. The silicon 3 passes into the refill container 7 via the first feed valve 6. When the first feed valve 6 is closed again, the refill container 7 is evacuated via the second feed valve 8 by means of the first low-pressure generation device 9, and a low pressure is generated. After evacuation of the refill container 7, the silicon 3 passes into the metering container 12 via the third feed valve 10, and then into the melting container 15 of the melting device 11 via the belt weigher 13. The melting device 11 causes the silicon 3 to melt in the melting container 15; the molten silicon 3 is introduced into the processing column 20 via the connection line 16 at the column head 25. The interior 19 of the reactor and the processing column 20 arranged therein have been heated to a reaction temperature $T_R$ by means of the second heating device 23, with the reaction temperature $T_R$ being greater than 1400° C., in particular greater than 1500° C., and in particular greater than 1600° C. In the melting device 11, the processing reactor 17, the cooling device 43, the main chamber 51 of the discharge device 49, the filtering device 60 and the condenser 71, there is a low pressure $P_R$ which was generated by means of the third low-pressure generation device 72 prior to the introduction of the silicon 3. The low pressure PR amounts to less than 1000 mbar, in particular less than 500 mbar, in particular less than 100 mbar, and in particular less than 0.01 mbar.

The liquid silicon 3 introduced into the processing column 20 flows from the separation container 33, which is nearest to the column head 25, through the separation tray holes 30 of the separation tray 29 into the separation container 33 arranged downstream thereof in the direction of flow 28, and from there into the remaining separation containers 33. The silicon 3 thus forms silicon layers in the individual separation containers 33. The silicon 3 arranged in layers in the processing column 20 is gassed with the process gas 37 by means of the gas supply device 16 via the first gas supply valve 38, the gas preheating device 39 and the gas supply line 35. The process gas 37 is introduced into the interior 19 of the reactor below the column foot 26 and flows in the direction opposite to the direction of flow 28 of the silicon 3 through the separation trays 29 and the silicon 3 arranged in layers towards the column head 25 of the processing column 20. The molten silicon 3 is thus gassed in a countercurrent flow. This causes the at least one impurity element and/or the impurity compound 2 to evaporate from the liquid silicon 3 so that the contaminated silicon 3 is purified and processed. The at least one impurity compound 2 may either be present in the contaminated silicon 3 already or may develop when the liquid silicon 2 is gassed in the processing column 20.

At the column foot 26, the purified silicon 3 drips into the cooling device 43 via the drip nose 27; when the drops of purified silicon 3 fall into the cooling container 45, they become solid, thus forming granules. The size of the granules can be influenced by inducing vibrations in the drip nose 27. Via the baffle plates 48, the granules fall into the collection container 56 of the discharge device 49. When the collection container 56 is filled with the purified silicon 3, it is moved, by means of the rolls 57, into one of the evacuated side chambers 52 via one of the first gate devices 53. After further cooling of the silicon 3, the collection container 56 is discharged via one of the second gate devices 59.

Furthermore, a flushing gas 41 is introduced into the reactor jacket space 22 at the column foot 26 by means of the gas supply device 36 via the second gas supply valve 42 and the second gas supply line 40. From the column foot 26, the gas 41 flows through the reactor jacket space 22 in the direction opposite to the direction of flow 28 towards the column head 25 where it surrounds the second heating device 23.

The off-gas flow developing during evaporation flows in the direction opposite to the direction of flow 28 towards the column head 25, and from there via the shut-off valve 61 into the filtering device 60. The filtering device 60 serves for fractional condensation and/or crystallization of the off-gas flow, wherein in the first filter element 64, evaporated silicon 3 is separated and thus recovered at a temperature of approx. 1300° C. The concentration of the impurity elements and/or impurity compounds 2, which are contained in the off-gas flow and require after-treatment, is advantageously increased by a factor of at least 2. When silicon 3 is processed, the first filter element 64 preferably comprises a hollow space with a bed of solid solar silicon, which results in an excellent separation and recovery of silicon 3.

The second filter element 65 is operated at a lower temperature than the first filter element 64 and serves for further filtering of the off-gas flow. Silicon oxide is for instance separated at a temperature of approx. 1100° C. The third filter element 66 is operated at a lower temperature than the second filter element 65 and also serves for further purification of the off-gas flow. A separation of other impurity elements and/or impurity compounds 2 such as phosphorous may take place at temperature of approx. 800° C. The off-gas flow is fully condensed in the condenser 71 arranged downstream of the filtering device 60; the condensate containing the remaining impurity elements and/or impurity compounds 2 is discharged and disposed of.

The process gas 37 may be an inert gas or a mixture of inert gases. Advantageously, the inert gases helium or argon are used. Alternatively, the process gas 37 may also be a reactive gas or a mixture of reactive gases. The reactive gas is advantageously formed by hydrogen- or oxygen-containing components such as water vapor, or by chlorine-containing gases such as chlorsilane, hydrogen chloride and chlorine. Alternatively, the process gas 37 may be a mixture of at least one inert gas and at least one reactive gas. Furthermore, the process gas 37 may be an oxidizing or reducing reactive gas or a mixture of reactive gases. The flushing gas 41 introduced into the reactor jacket space 22 is advantageously an inert gas or a mixture of inert gases.

As an alternative to one processing column 20, at least two, in particular at least three, and in particular at least five processing columns 20 may be arranged as a bundle in the reactor container 18.

Furthermore, the filtering device 60 may consist of a flushable, meander-shaped, high-temperature resistant web of silicon dioxide or graphite, wherein the separated condensates are removable in a defined manner by means of a scraping device and fall into a container which may be discharged during continuous operation. Alternatively, the filtering device 60 may be a cooled cyclone in which condensation of the hot off-gas flow occurs.

Downstream of the processing column 20, the purified silicon 3 may furthermore be subjected to controlled solidification so as to form a bar which can be discharged continuously. Downstream of the processing column 20, the purified silicon 3 may alternatively also be cast into a film.

The countercurrent-flow gassing in the processing column 20 facilitates the reduction of impurity elements and/or impurity compounds 2 such as phosphorous, arsenic, antimony, boron, carbon, sulfur, aluminum, gallium, tin, zinc, lead as well as alkaline earth elements and alkaline elements. The passage of the silicon 3 is controlled by the melting speed and the gas flow of the process gas 37. The fractional condensation, crystallization or sublimation of the impurity elements and/or impurity compounds 2 contained in the off-gas flow allows the greatest portion of the evaporated silicon 3 to be recovered by means of the filtering device 60, with the impurity elements and/or impurity compounds 2 being condensed into a compact form.

In addition to the process gas 37, a second stationary or mobile phase in the form of a purifying slag may be introduced into the processing reactor 17; due to the layout of the processing reactor 17, the slag comes into intimate contact with the silicon 3 to be purified.

In a first preferred method, the so-called vacuum method, the molten silicon 3 is purified by means of a low inert gas flow at a low pressure of less than 0.01 mbar. This method reduces the concentration of in particular phosphorous, lead, antimony and arsenic. In another preferred method, the so-called gas blowing method, the molten silicon 3 is purified by means of a reactive gas flow at a low pressure, with this method reducing the concentration of in particular carbon, boron and aluminum.

The method according to the invention will now be explained using several examples.

Example 1

Reducing the Concentration of Phosphorous in 10 Separation Stages by Means of Argon Gassing When 1.5 kg of contaminated silicon are gassed with argon in the melting process thereof at a temperature of 1500° C. and a pressure of 1 mbar, this results in the evaporation of approx. 172 g of silicon and 3.6 g of phosphorous in the processing column comprising 10 separation stages, in other words ten separation trays. More than half of the amount of silicon contained in the off-gas flow has condensed already when the off-gas flow has cooled to 1300° C.; at a temperature of 800° C., the recovery of silicon is almost complete. The silicon was supplied to the processing column comprising 10 separation trays at a speed of 2 kg/h. The initial concentration of phosphorous was $100 \times 10^{-6}$ atoms per each atom of silicon (=100 ppma). 5 mol of argon were added in countercurrent flow per each mol of silicon and per each separation tray at a low pressure of approx. 1 mbar and a temperature of 1500° C. After purification in the processing column, the partly solidified silicon was collected in a shell and remelted for characterization thereof before being subjected to controlled solidification. The concentration of phosphorous after the processing of the silicon was 0.04 ppma. The evaporation loss of the silicon amounted to approx. 15%.

Example 2

Evaporation of Impurity Elements and Fractional Condensation of the Off-Gas Flow When 1.5 kg of contaminated silicon are gassed with argon in the melting process thereof at a temperature of 1500° C. and a pressure of 1 mbar in a processing column comprising 10 separation stages, in other words ten separation trays, this results in the evaporation of approx. 172 g of silicon and 3.6 g of arsenic, antimony and phosphorous. More than half of the amount of evaporated silicon has condensed already when the off-gas flow has cooled to 1300° C.; at a temperature of 800° C., the recovery of silicon is almost complete. Below 200° C., a sufficient separation of other impurity elements and impurity compounds such as silicon oxide and silicon dioxide is achieved.

Figure 5:
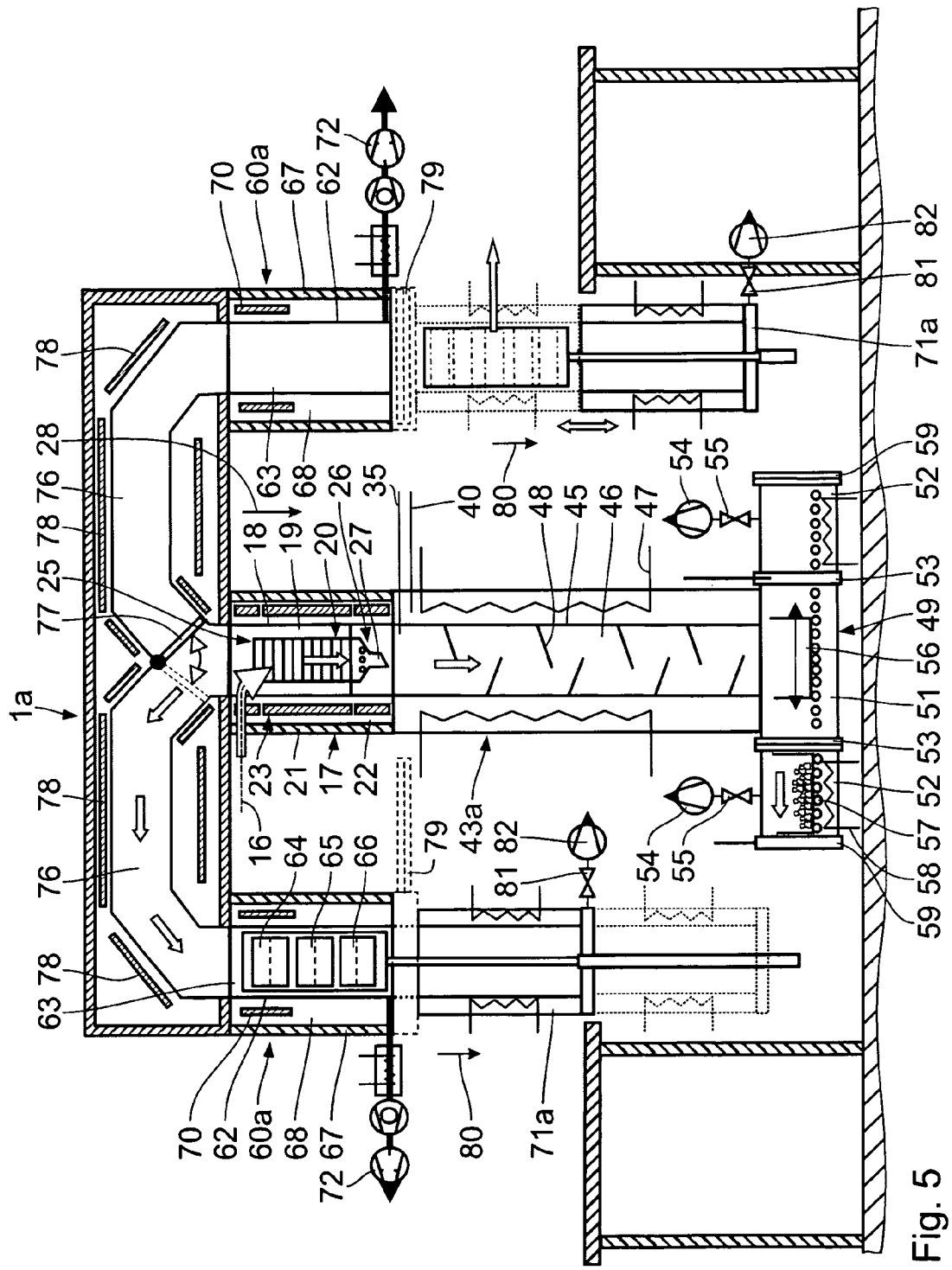
FIG. 5 shows a device for the processing of non-ferrous metals according to a second embodiment.

The following is a description of a second embodiment of the invention with reference to FIG. 5. Identically constructed parts have the same reference numerals as in the first embodiment to the description of which reference is made. Differently constructed but functionally identical parts have the same reference numerals with a subsequent a. The second embodiment is provided with two filtering devices 60a. The filtering devices 60a are in each case connected to the reactor container 18 by means of an off-gas duct 76. The filtering devices 60a are switchable by means of a pivotable flap 77 which is arranged in the direction of flow 28 above the column head 25 for closing one of the off-gas ducts 76 depending on the position of the flap 77. The off-gas ducts 76 are bent in the shape of a U and are surrounded by duct heating elements 78.

On a side remote from the off-gas duct 76, the filtering devices 60a are in each case closable by means of a shut-off valve 79.

Downstream of the filtering devices 60a is arranged in each case one condenser 71a which is displaceable along a direction of displacement 80. The condensers 71a are in each case connected to a fourth low-pressure generation device 82 via a condenser valve 81. For replacing the filter elements 64, 65, 66, the filter elements 64, 65, 66 and the associated condenser 71a are displaced in the direction of displacement 80 until the filter elements 64, 65, 66 are disposed outside the filtering device 60a. While the filter elements 64, 65, 66 are being replaced, the flap 77 closes off the associated off-gas duct 76 so that the off-gas flow flows towards the operating filtering element 60a through the additional off-gas duct 76. This ensures an easy replacement of the filter elements 64, 65, 66.

Figure 6:
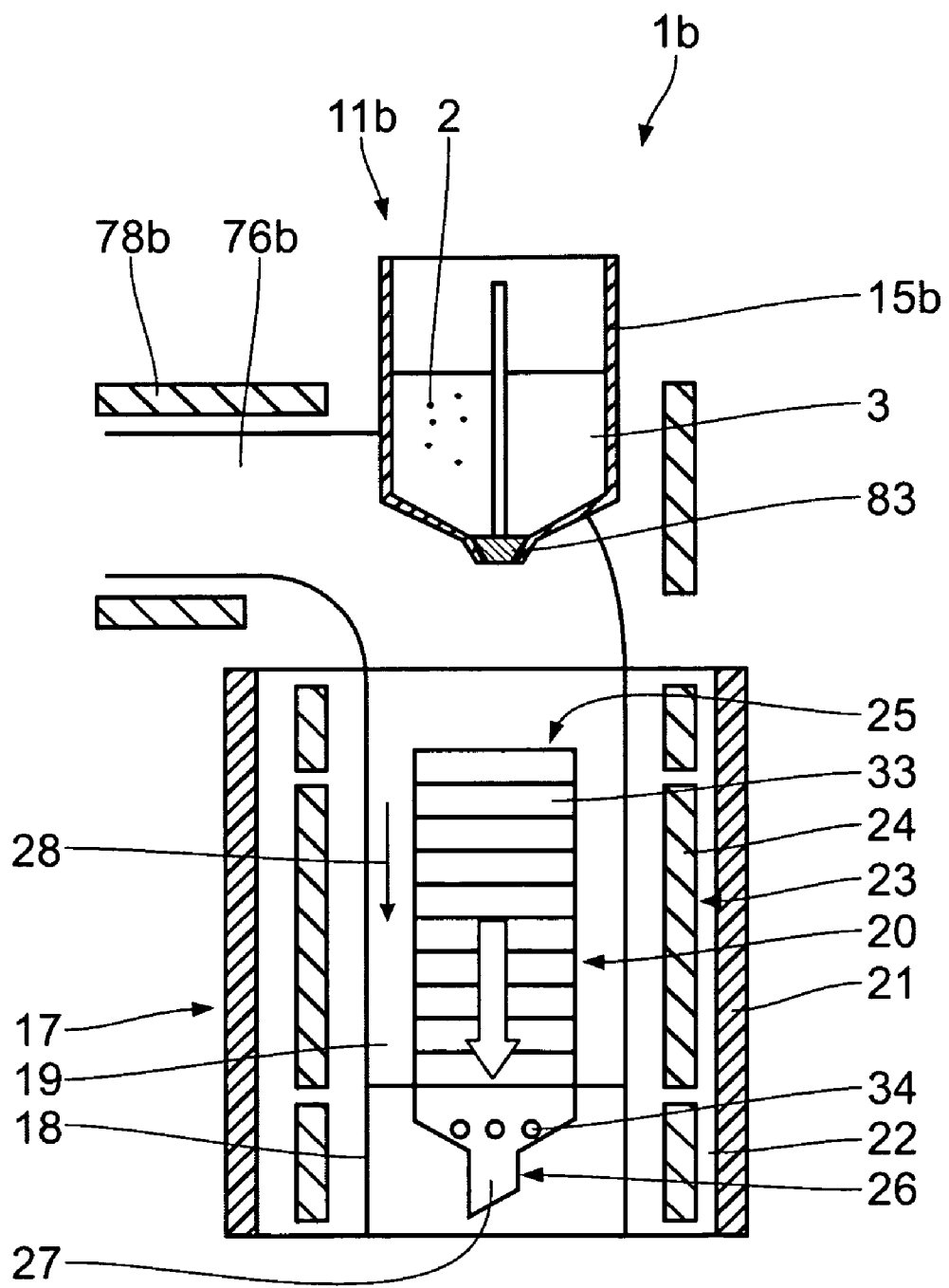
FIG. 6 is a view of a portion of a device for the processing of non-ferrous metals according to a third embodiment.

The following is a description of a third embodiment of the invention with reference to FIG. 6. Identically constructed parts have the same reference numerals as in the first embodiment to the description of which reference is made. Differently constructed but functionally identical parts have the same reference numerals with a subsequent b. In this embodiment, the melting device 11b comprises a melting container 15b with a needle valve 83. The needle valve 83 of the melting container 15b allows the molten silicon 3 to drip directly into the column head 25 of the processing column 20. A part of the melting container 15b is arranged in the off-gas duct 76b. A design of the melting container 15b of this type permits easy metering of the molten silicon 3.

The features of the embodiments are not mutually exclusive and may be combined to form embodiments with a random combination of these features.

While specific embodiments of the invention have been described in detail to illustrate the application of the principles of the invention, it will be understood that the invention may be embodied otherwise without departing from such principles.

The invention claimed is:

1. A method for processing silicon, the method comprising the following steps:
   providing at least one processing reactor, said at least one processing reactor comprising at least one reactor container, at least one processing column arranged inside the reactor container, and at least one heating device arranged outside the reactor container;
   melting silicon, which is contaminated with one or more of at least one impurity element and at least one impurity compound, by means of at least one melting device to form molten silicon;
   supplying the molten silicon to the at least one processing column;
   heating the at least one processing column to a reaction temperature by means of the at least one heating device;
   generating a low pressure in the reactor container by means of at least one low-pressure generation device;
   gassing the molten silicon, which has been supplied to the at least one processing column, with at least one gas by means of a gas supply device;
   evaporating said one or more of at least one impurity element and at least one impurity compound from the silicon, which is at least one of surrounded and passed through by the at least one gas, at low pressure;
   recovering silicon, which has evaporated during the evaporation, by means of at least one filtering device, said filtering device comprising a first filter element and at least a second filter element; and
   discharging the processed silicon from the processing reactor, wherein the first filter element comprises a hollow space with a bed of solid solar silicon.

* * * * *